United States Patent
Fujii et al.

(10) Patent No.: US 7,007,217 B2
(45) Date of Patent: Feb. 28, 2006

(54) RADIO COMMUNICATION APPARATUS

(75) Inventors: Hidekazu Fujii, Tenri (JP); Toru Ueda, Kyoto (JP); Yoshihiro Ohtani, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 364 days.

(21) Appl. No.: 10/466,688

(22) PCT Filed: Jan. 22, 2002

(86) PCT No.: PCT/JP02/00441

§ 371 (c)(1),
(2), (4) Date: Jul. 21, 2003

(87) PCT Pub. No.: WO02/060113

PCT Pub. Date: Aug. 1, 2002

(65) Prior Publication Data

US 2004/0063466 A1    Apr. 1, 2004

(30) Foreign Application Priority Data

Jan. 26, 2001  (JP) .............................. 2001-019230

(51) Int. Cl.
  G08C 25/02    (2006.01)
  H04L 1/18     (2006.01)
(52) U.S. Cl. .................................................. 714/748
(58) Field of Classification Search .................... None
  See application file for complete search history.

(56) References Cited

U.S. PATENT DOCUMENTS 5,689,439 A * 11/1997 Weerackody et al. ....... 370/329
5,799,042 A *  8/1998 Xiao ........................... 375/285

FOREIGN PATENT DOCUMENTS

| JP | 01-154645 A | 6/1989 |
| JP | 02-39735 A | 2/1990 |
| JP | 4-10723 A | 1/1992 |
| JP | 6-303218 A | 10/1994 |
| JP | 8-307330 A | 11/1996 |
| JP | 9-200103 A | 7/1997 |
| JP | 10-322670 A | 12/1998 |
| JP | 11-27243 A | 1/1999 |
| JP | 2000-295151 A | 10/2000 |
| JP | 2001-16209 A | 1/2001 |

* cited by examiner

Primary Examiner—Shelly Chase
(74) Attorney, Agent, or Firm—Birch,Stewart,Kolasch & Birch,LLP (57) ABSTRACT

A receiving device includes a receiving section for receiving a real-time signal; a packet analyzing section; an error correction section for correcting an error block in a packet; a communication path evaluation section; a buffer for storing data; a plurality of antennas; an antenna switching section; an antenna switching control section for giving instructions to switch between the antennas, in accordance with the result of the evaluation of a communication path performed for each predetermined unit; a retransmission request control section for performing retransmission request, in accordance with the result of the evaluation; a packet assembling section for assembling a retransmission request packet; and a sending section for sending the retransmission request packet. The retransmission request control section performs the retransmission request on condition that the real-time tranmission is not interrupted.

17 Claims, 6 Drawing Sheets

RADIO COMMUNICATION APPARATUS

This application is the national phase under 35 U.S.C. § 371 of PCT International Application No. PCT/JP02/00441 which has an International filing date of Jan. 22, 2002, which designated the United States of America.

TECHINICAL FIELD

The present invention relates to a wireless communication device which handles real-time transmission data when connected to devices such as a television, video, and DVD (Digital Versatile Disc or Digital Video Disc) handling image signals and audio signals.

BACKGROUND ART

AV (Audio Visual) systems connected to various devices such as a television, video, and DVD (Digital Versatile Disc) handling image signals and audio signals have become commonly used in general household.

To establish an AV system, image signals and audio signals have typically been transmitted between devices using coaxial cables and optical fibers. For this reason, physical limitations are imposed on the connection between devices.

However, there is a recently-developed transmission system which can increase the freedom of the connection between devices. In this system, analog signals such as image signals and audio signals are converted to digital signals, and transmitted using packet wireless communication method. A video/sound transmitting system disclosed by Japanese Laid-Open Patent Application No. 10-322670/1998 (Tokukaihei 10-322670) is one of known examples of the above-mentioned transmission system.

However, the aforementioned wireless communication device has such a defection that the more the transmission distance is lengthened, the more the device becomes vulnerable to multipath. phasing, and since the signal degradation caused during the transmission is unavoidable, it is difficult to obtain high-quality outputs. Here, the multipath phasing is briefly explained as below. An outgoing radio wave is typically reflected, scattered, and diffracted by various media, before arriving at a receiving end. Since the reflected wave, scattered wave, and diffracted wave pass through each different path, these waves arrive at the receiving end at each different time. Then the waves are combined with each other in the receiving end, and electric field intensity is determined. On this occasion, the waves may be in phase with each other and hence added up, or may be out of phase and hence cancel each other out. Thus, the electric field intensity fluctuates, in other words, so-called phasing occurs. This is the multipath phasing.

By reason of this signal degradation due to the multipath phasing, an image or sound from the device performing real-time transmission, such as television, is interrupted, if an error still remains at the instant of playback. On this account, users cannot fully enjoy the content to be played.

To solve this problem, for instance, Japanese Laid-Open Patent Application No. 2-39735/1990 (Tokukaihei 2-39735) discloses an antenna diversity method selecting one of a plurality of antennas. In this method, for instance, terminal levels of the respective antennas are compared with each other and an antenna receiving a phasing wave with the highest level is selected.

However, in this conventional method, the received level is determined during a period of a preamble (start code) section which is for synchronizing the reading at the head of a packet, and thus the preamble section has to be sufficiently long in order to switch the antennas so as to select the most suitable antenna by determining the received level in the preamble section. For this reason, to solve this problem, it is necessary for the method to adopt a hardware or high-speed CPU (Central Processing Unit) for high-speed processing.

The present invention has been developed for solving the foregoing problems of conventional arts, thereby aiming at providing a wireless communication device which can improve the quality of signals without adopting a hardware or high-speed CPU for high-speed processing, on the occasion that image and audio signals are transmitted between devices of an AV system through wireless communication.

DISCLOSURE OF THE INVENTION

To solve the foregoing problems, a wireless communication device of the present invention, realizing real-time transmission through bandwidth guarantee, comprises a receiving device, the receiving device being characterized by including: receiving means which receives a real-time signal; packet analyzing means which analyzes a packet of the real-time signal received by the receiving means; error detection/correction means which detects an erroneous block if at least one block in the packet includes an error, and corrects the error which has been detected as much as possible; communication path evaluation means which evaluates a communication path, in accordance with an output from the error detection/correction means; a buffer which temporarily stores received data; at least two antennas; antenna switching means for switching between the antennas; antenna switching control means which causes the antenna switching means to switch between the antennas, in accordance with a result of evaluation of the communication path performed by the communication path evaluation means for each predetermined unit; retransmission request control means which performs retransmission request, in accordance with the result of the evaluation; packet assembling means which assembles a retransmission request packet, in accordance with an order from the retransmission request control means; and sending means which outputs the retransmission request. packet supplied from the retransmission request control means, the retransmission request control means performing the retransmission request on condition that the real-time transmission is not interrupted.

According to this invention, the receiving device of the wireless communication device includes the receiving means for receiving a real-time signal, and the signal outputted from the receiving means is analyzed by the packet analyzing means, subjected to error detection or error correction in the error detection/correction means, and then stored in the buffer. In accordance with the information in the error detection/correction means, the communication path evaluation means evaluates the communication path, and the antenna switching control means selects an antenna which is the most suitable at this time. Further, in accordance with the result of the evaluation of the communication path performed by the communication path evaluation means for each predetermined unit, a packet or block which has to be retransmitted is determined by the retransmission information control means, and the packet assembling means assembles a retransmission request packet. The sending means sends this retransmission request packet to the sending device which has sent the real-time signal.

This receiving device of the wireless communication device allows to minimize the possibility of the interruption of real-time transmission due to retransmission, even if a signal is degenerated during the transmission. Further, if circumstances permit the retransmission, it is possible to switch the antenna after the occurrence of an error, since the error can be recovered by the retransmission. For this reason, it is unnecessary to adopt a hardware or high-speed CPU for high-speed processing in a preamble. Further, since it is unnecessary to select the most suitable antenna for the preamble, the switching of the antenna can be carried out after receiving the packet so that a period until performing the synchronization can be shortened, and as a result the length of the preamble can be shortened.

Consequently, it is possible to provide a wireless communication device which can improve the quality of signals, without including a hardware or high-speed CPU for high-speed processing, when image and audio signals are transmitted between devices of an AV system through wireless communication.

Further, the foregoing wireless communication device of the present invention is characterized in that the communication path evaluation means includes packet loss detection means which detects, in the real-time signal, a packet which could not be received.

According to the invention, a lost packet is detected by the packet loss detection mans so that a more suitable antenna can be selected. For this reason, it is possible to recover a packet which could not be received by the receiving device, by performing retransmission request.

Further, the foregoing wireless communication device of the present invention is characterized in that, the communication path evaluation means detects (i) a block which is beyond a range of correction and determined as uncorrectable, even if the error detection/correction means attempted to correct errors in each block in the packet, and (ii) a block, which is uncorrectable by nature, in the packet.

According to the invention, since the uncorrectable block detection mans etects a block which is either uncorrectable or erroneous so that a more suitable antenna can be selected, a block which could not be received by the receiving device can be received by by the receiving device, by performing retransmission request.

Further, the foregoing wireless communication device of the present invention is characterized in that the communication path evaluation means includes error rate measuring means which measures a ratio of occurrence of errors in the communication path.

According to this invention, the error rate in the communication path is measured by the error rate measuring means so that a more suitable antenna can be selected.

Further, the foregoing wireless communication device of the present invention is characterized in that, the communication path evaluation means includes received level measuring means which measures a received level in the communication path.

According to this invention, the received level in the communication path is measured by the received level measuring means so that a more suitable antenna can be selected.

Further, the foregoing wireless communication device of the present invention is characterized in that, the antenna switching control means gives instructions to switch between the antennas, when the result of the evaluation of the communication path is worse than a predetermined value.

According to this invention, when the result of the evaluation of the communication path performed by the communication path evaluation means is worse than a predetermined value, it is possible to select a more sensitive antenna by means of the antenna switching control means.

Further, the foregoing wireless communication device of the present invention is characterized in that, the antenna switching control means gives instructions to switch between the antennas in increments of a predetermined number of packets.

According to this invention, when the condition of communication is unstable right after the switching, the condition is detected and the antenna is switched in increments of a predetermined number of packets, so that it is possible to prevent the antenna from being frequently switched packet-by-packet.

Further, the foregoing wireless communication device of the present invention is characterized in that, the antenna switching control means gives instructions to restore a previous antenna, when the result of the evaluation of the communication path worsens after the antennas have been switched.

According to this invention, the antenna switching control means gives instructions to restore a previous antenna, when the result of the evaluation of the communication path worsens after the antennas have been switched. With this arrangement, it is possible to prevent the condition of communication from being further worsened.

Further, the foregoing wireless communication device of the present invention is characterized in that, the antenna switching control means gives instructions to switch between the antennas only when the retransmission request can be performed not less than twice.

According to this invention, even if the condition of communication has worsened after the switching of the antennas, the antenna switching control means gives instructions to switch between the antennas only after performing the retransmission request not less than twice, and hence it is possible to make a recovery during the period of performing the retransmission request not less than twice.

Further, the foregoing wireless communication device of the present invention is characterized in that, the antenna switching control means gives instructions not to switch between the antennas when a number of requests for retransmission surpasses a predetermined number.

That is to say, when the number of requests for retransmission surpasses a predetermined number, it is indicated that there are a lot of packets requesting retransmission so that the real-time transmission could be interrupted if the condition of reception further worsens.

In this invention, the antenna switching control means gives instructions not to switch the antenna on this occasion. With this arrangement, it is possible to prevent the interruption of the real-time transmission due to the further deterioration of the condition of communication caused by the switching of the antenna.

Further, the foregoing wireless communication device of the present invention is characterized in that, the antenna switching control means gives instructions to switch between the antennas when the number of the requests for retransmission keeps surpassing the predetermined number for a predetermined number of times.

According to this invention, the antenna switching control means gives instructions to switch between the antennas when the number of the requests for retransmission keeps surpassing the predetermined number for a predetermined number of times, and hence the continuation of bad condition of communication can be avoided.

Further, the foregoing wireless communication device of the present invention is characterized in that, the retransmission request control means can set priorities to either blocks in one packet or packets, which request retransmission, in accordance with the result of the evaluation of the communication path.

According to this invention, the retransmission request control means can set priorities to either blocks in one packet or packets, which request retransmission, in accordance with the result of the evaluation of the communication path performed by the communication path evaluation means for each predetermined unit. With this arrangement, it is possible to minimize the possibility of the interruption of the real-time transmission, since the retransmission request control means performs the transmission request from either blocks in one packet or packets having higher priorities.

Further, the foregoing wireless communication device of the present invention is characterized in that, when performing the retransmission request, the retransmission request control means discards information of either blocks in one packet or packets, which have already caused interruption of the real-time transmission, and hence the retransmission request control means do not request retransmission of these blocks or packets.

According to this invention, when performing the retransmission request, the retransmission request control means discards information of either blocks in one packet or packets, which have already caused interruption of the real-time transmission, and hence the retransmission request control means do not request retransmission of these blocks or packets. With this arrangement, it is possible to prevent the retransmission request control means from unnecessarily performing retransmission request.

Further, the foregoing wireless communication device of the present invention is characterized in that, the packet assembling means can request retransmission of either a plurality of blocks in one packet or a plurality of packets at a time.

According to this invention, since the packet assembling means can request retransmission of either a plurality of blocks in one packet or a plurality of packets at a time, it is possible to increase the number of real-time signals to be recovered by the retransmission.

For a fuller understanding of the nature and advantages of the invention, reference should be made to the ensuing detailed description taken in conjunction with the accompanying drawings.

BEST MODES FOR CARRYING OUT THE INVENTION

Referring to figures, the following will describe an embodiment of the present invention.

A wireless communication device of the present embodiment is composed of a receiving device and a sending device.

Figure 1:
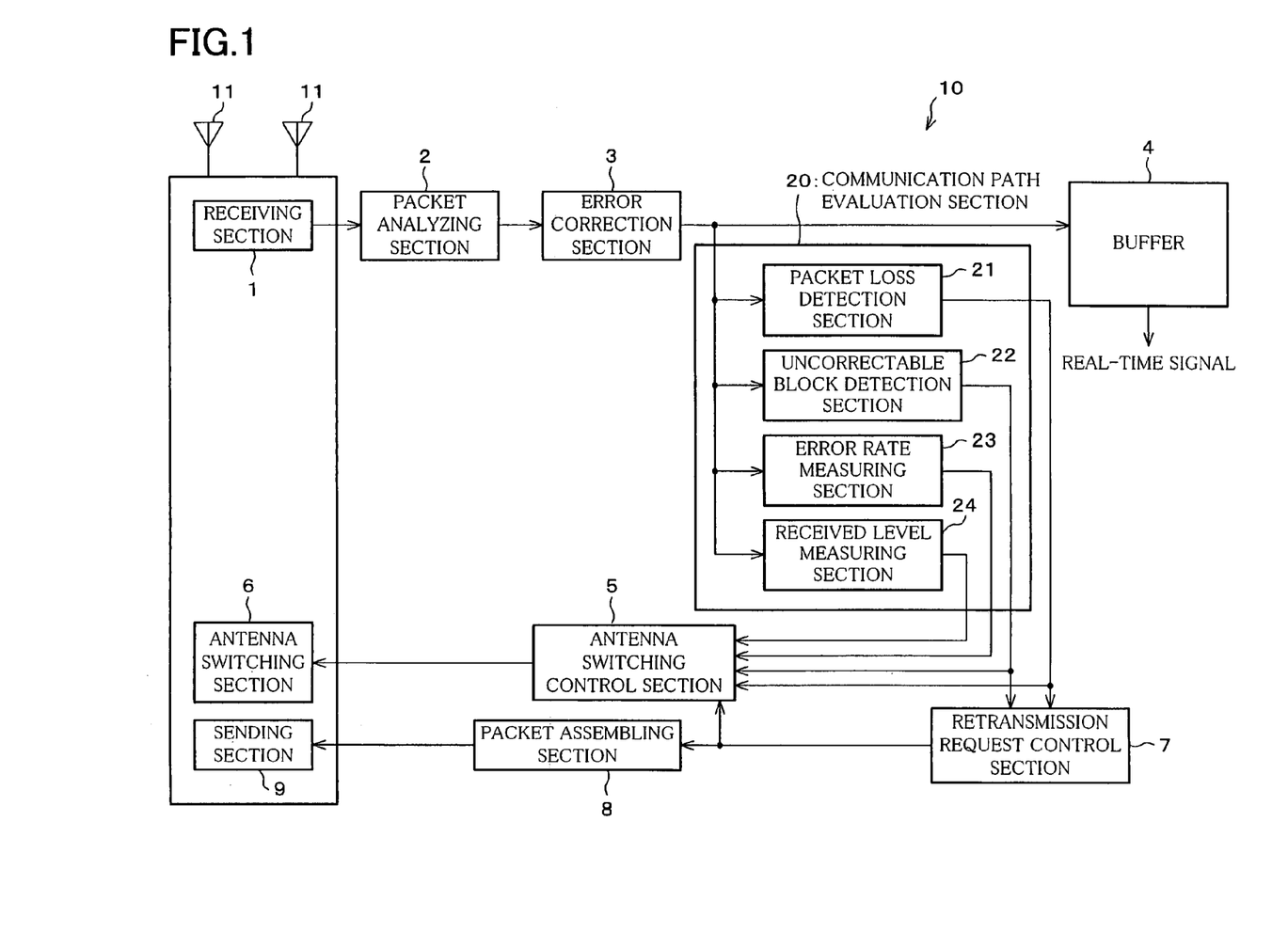
FIG. 1 is a block diagram, illustrating an embodiment of a receiving device of a wireless communication device in accordance with the present invention.

As illustrated in FIG. 1, the receiving device 10 includes: a receiving section 1 as receiving means, which receives a bandwidth-guaranteed real-time signal; a packet analyzing section 2 as packet analyzing means; an error correction section 3 as error detection/correction means; a buffer 4 for temporarily storing received data; a communication path evaluation section 20 as communication path evaluation means; an antenna switching control section 5 as antenna switching control means; an antenna switching section 6 as antenna switching means, which is provided for switching between antennas, in accordance with instructions from the antenna switching control section 5; a retransmission request control section 7 as retransmission request control means; a packet assembling section 8 as packet assembling means, for assembling a retransmission request packet in accordance with instructions from the retransmission request control section 7; a sending section 9 as sending means; and a plurality of antennas 11 for receiving or sending signals.

The packet analyzing section 2 analyzes a real-time signal packet received by the receiving section 1.

Figure 2:
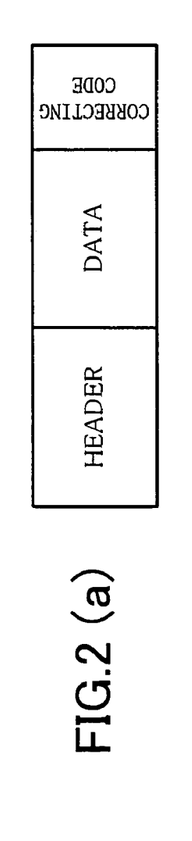
FIG. 2(a) illustrates a format of a real-time signal packet received by the receiving device, when the packet is composed of a single set of data.
FIG. 2(b) illustrates a format of the real-time signal packet received by the receiving device, when the packet is composed of more than one set of data and includes a plurality of blocks.

On this occasion, a basic format of data packets of real-time signals for, for example, visual communication, the data packets being received by the receiving section 1, is composed of a header, a set of data, and a correcting. code, as illustrated in FIG. 2(a). Although the format in FIG. 2(a) includes a single set of data in one packet, one packet may include more than one set of data, and in this case, a plurality of blocks each composed of a set of data and a correcting code are provided after a header, as illustrated in FIG. 2(b). Note that, before and after the header and set of data, a preamble (start code) which is for synchronizing the reading at the head of a packet (not illustrated) and a postamble (terminal code) which indicates termination are provided, respectively.

Meanwhile, the error correction section 3 in FIG. 1 at least detects an error block when such an error block exists in a packet, and corrects detected errors of respective blocks in the packet, as much as possible. It is noted that although this error correction section 3 corrects errors, the present invention is not to be limited by this arrangement so that the error correction section 3 may only detect errors.

The communication path evaluation section 20 is composed of: a packet loss detection section 21 as packet loss detection means, which detects the loss of data packets in a real-time signal for, for example, visual communication, the data packets being received by the receiving section 1; an uncorrectable block detection section 22 as uncorrectable block detection means, which detects a block which is beyond the range of correction performed by the error correction section 3; an error rate measuring section 23 as error rate measuring means, which measures the rate of errors included in the packet; and a received level measuring section 24 as received level measuring means, which measures the field intensity of a received radio wave.

Further, the communication path evaluation section 20 evaluates the communication path for each predetermined unit, and in accordance with the results of this evaluation, the antenna switching control section 5 orders the antenna switching section 6 to perform the switching of an antenna. Also in accordance with the results of the foregoing evaluation, the retransmission request control section 7 requests the retransmission of a packet or block with an error to the sending device 30 (described later), thereby causing the sending device 30 to issue a retransmission request on condition that the real-time transmission is maintained.

Figure 3:
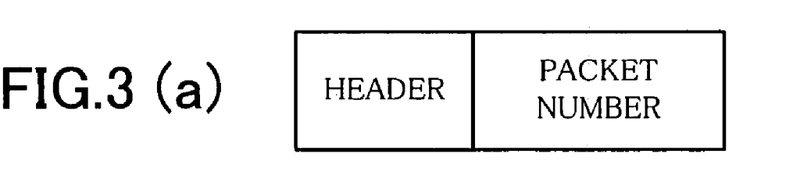
FIG. 3(a) illustrates a format of a retransmission request packet transmitted from the receiving device.
FIG. 3(b) illustrates a format of the retransmission request packet transmitted from the receiving device, when a plurality of block numbers are designated.

On this occasion, a basic format of a retransmission packet is, as illustrated in FIG. 3(a), composed of a header and a packet number. In other words, a packet number which is necessarily retransmitted is transmitted along with a header. Moreover, as in FIG. 2(b), provided that any one of a plurality of blocks in one packet is wished to be retransmitted, a block number which requests retransmission is, as in FIG. 3(b), provided after a header.

Now, an operation concerning the receiving device 10 will be illustrated as below.

As in FIG. 1, a real-time signal for, e.g., visual communication, received in the format in FIG. 2(a) or 2(b) and received by the receiving section 1, is first of all analyzed by the packet analyzing section 2 so that the arrangement of the packet such as its length is assessed, and then the error correction section 3 performs error correction with respect to the signal. The signal having been subjected to the error correction in the error correction section 3 is sent to the buffer 4 and the communication path evaluation section 20.

The information of the communication path evaluation section 20 is sent to the antenna switching control section 5, and the antenna switching control section 5 evaluates an antenna 11 which has currently been used, and determines whether or not the current antenna 11 is to be switched to another antenna 11. If the antenna 11 has already been switched in the previous stage, the antenna switching control section 5 determines which. one of the antennas 11 is to be adopted, according to the result of the evaluation of the antenna 11 in the previous stage. Subsequently, the antenna switching control section 5 feeds a signal to the antenna switching section 6.

In the meantime, the information of the packet loss detection section 21 and uncorrectable block detection section 22 both provided in the communication path evaluation section 20 is supplied to the retransmission request control section 7, and after setting priorities of retransmission requests in order not to interrupt the real-time transmission, the retransmission request control section 7 issues a retransmission request to the packet assembling section 8. The packet assembling section 8 then assembles a retransmission request packet, thereby sending the packet by means of the sending section 9.

Figure 4:
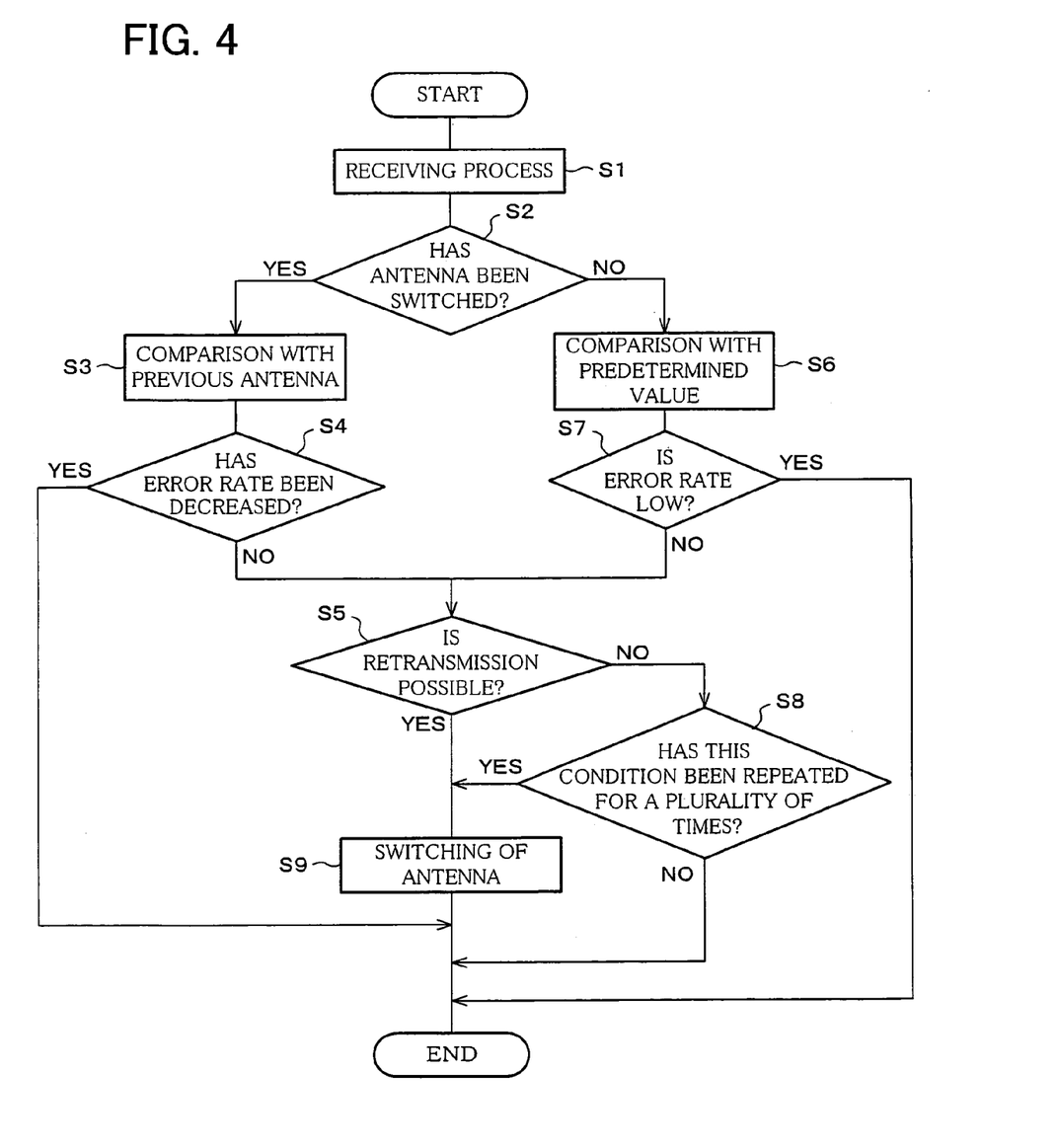
FIG. 4 is a flow chart, illustrating a control operation performed by an antenna switching control section of the receiving device.

Now, the control method for the antenna switching control section 5 is specifically described in reference to the flow chart in FIG. 4.

As in the figure, the receiving process is arranged in the following manner. First, the error correction section 3 performs error correction, and then the communication path evaluation section 20 simultaneously perform packet loss detection, uncorrectable block detection, error rate measurement, and received level measurement (S1). Subsequently, it is determined whether or not the antenna 11 has been switched in the previous stage (S2). If switched, the antenna 11 before the switching is compared with the antenna 11 after the switching, with regard to a packet loss factor, rate of uncorrectable blocks, error rate, and received level (S3), and it is determined whether or not the error rate has been decreased (S4).

If it is determined that the receiving condition has been improved according to the judgment in S4, the entire process is terminated. If it is determined that the receiving condition has been deteriorated according to the judgment in S4, whether the retransmission is possible or not is determined (S5).

On the other hand, if it has been determined in S2 that the antenna 11 was not switched in the previous stage, the packet loss factor, rate of uncorrectable blocks, error rate, and received level of the antenna 11 are compared with respective predetermined values (S6), and it is determined whether or not the error rate has been decreased (S7). If it is determined in S7 that the receiving condition is good, the entire process is terminated. If it is determined in S7 that the receiving condition is bad, whether the retransmission is possible or not is determined (S5).

To determine whether or not the retransmission is possible, first of all, in accordance with the information from the retransmission request control section 7 in FIG. 1, it is determined that whether or not the receiving condition which is caused to be bad owing to the switching of the antenna 11 can be recovered by the retransmission. If the recovery is possible but many requests for retransmission still remain so that the real-time transmission could be interrupted on condition that the receiving condition is further worsened, or if the real-time transmission has already been interrupted, whether or not this condition has continued for a plurality of times is determined (S8). That is to say, in S8, how many times a particular antenna 11 has gone through this step S8 is counted. If the number of times having been counted exceeds a predetermined number, the particular antenna is switched to another antenna in order to stop the continuation of bad receiving condition (S9), and the entire process is terminated. If in S8 the number of times having been counted is less than the predetermined number, the entire process is immediately terminated.

Figure 5:
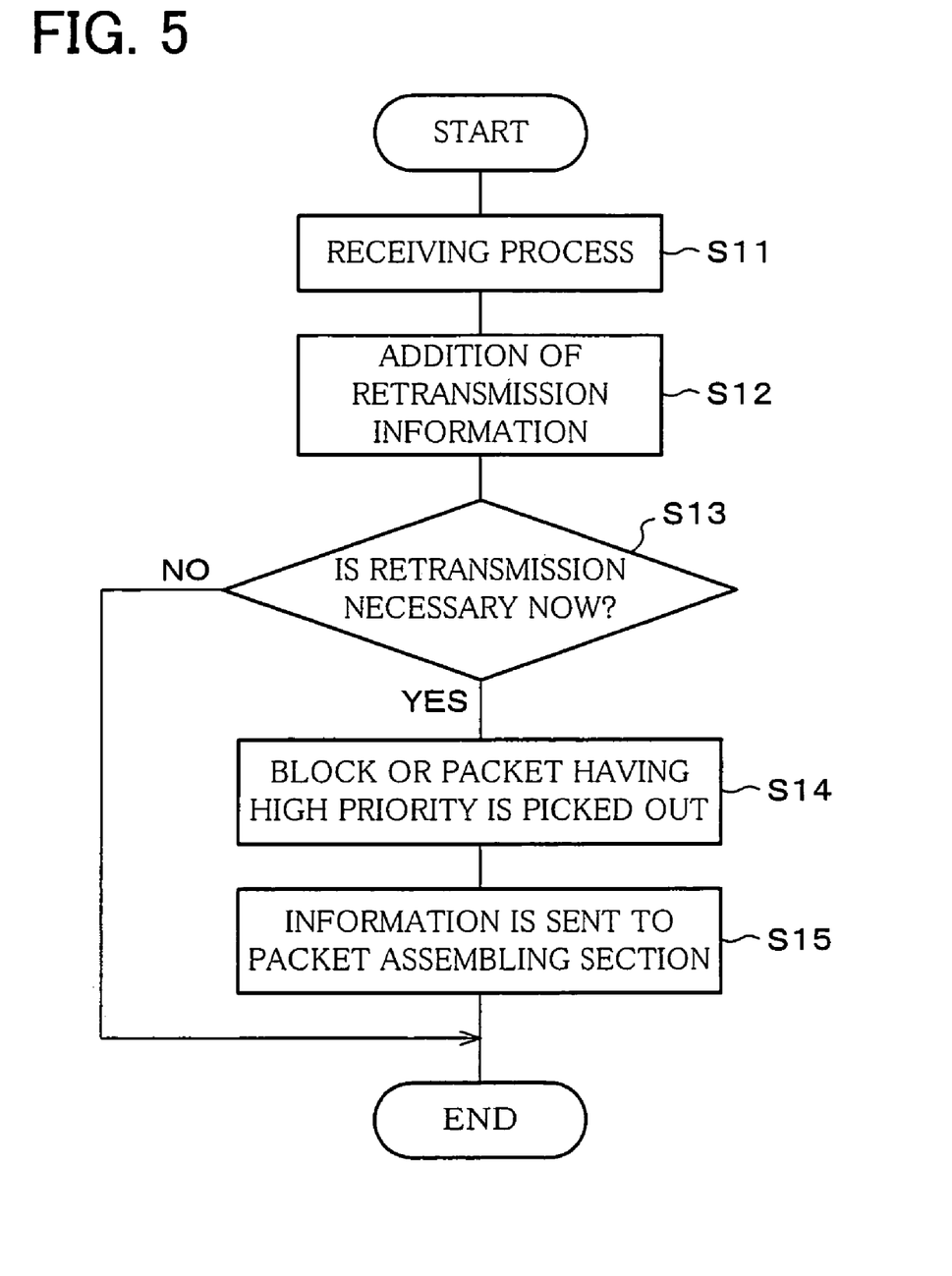
FIG. 5 is a flow chart, illustrating a control operation performed by a retransmission request control section of the receiving device.

Next, referring to a flow chart in FIG. 5, a method of controlling the retransmission request control section 7 will be specifically described.

As the figure indicates, in the receiving process, the error correction section 3 performs error correction, and then in the communication path evaluation section 20, the packet loss detection section 21 performs packet loss detection and the uncorrectable block detection section 22 performs uncorrectable block detection (S11).

Subsequently, the retransmission request section 7 performs addition of retransmission information in line with the result of the receiving process (S12), so that the priorities of retransmission are set. For instance, in accordance with the result of the uncorrectable block detection, packets including a lot of uncorrectable blocks are given high priorities. Then it is determined that whether or not the requests for retransmission still remain at this time (S13), and if not, the entire process is terminated. If a remaining request is found in S13, a block or packet having a high priority is picked out from the retransmission information (S14). After sending the picked block or packet to the packet assembling section 8 (S15), the entire process is terminated.

Figure 6:
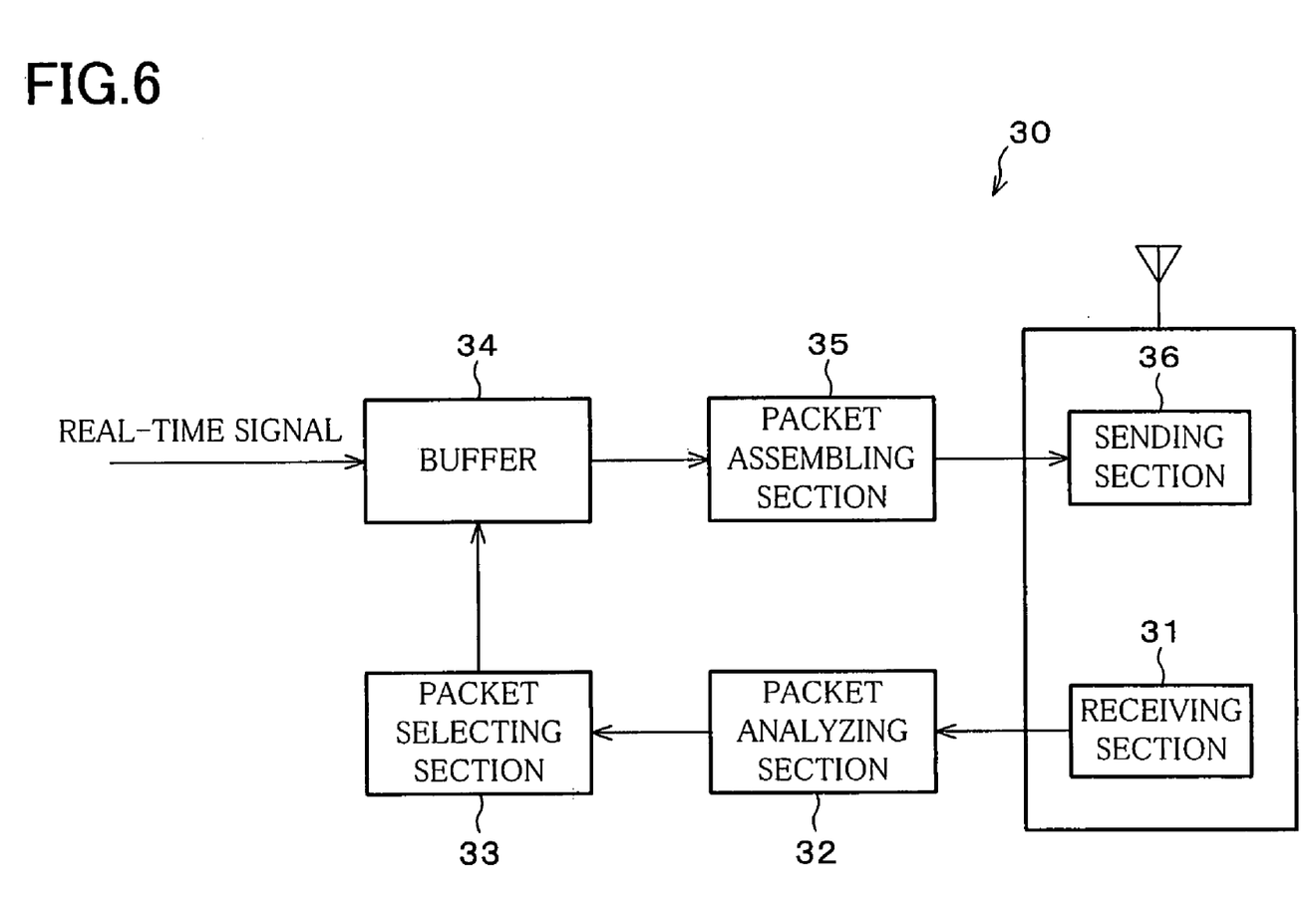
FIG. 6 is a block diagram, illustrating an arrangement of a sending device of the wireless communication device.

Next, the sending device 30 corresponding to the receiving device 10 of the foregoing wireless communication device will be described.

As FIG. 6 illustrates, the sending device 30 corresponding to the receiving device 10 includes a receiving section 31, a packet analyzing section 32, a packet selecting section 33, a buffer 34, a packet assembling section 35, and a sending section 36.

In the sending device 30, the packet analyzing section 32 determines which block or packet in a retransmission request packet received from the receiving device 10 by the receiving section 31 has to be re-transmitted. Then in accordance with the determination in the packet analyzing section 32, the packet selecting section 33 selects a block or packet having a high priority. Then the packet assembling section 35 assembles a packet using suitable packets or blocks picked up from the buffer 34 where real-time signals are stored, and the packet having been assembled is sent to the sending section 36, then re-transmitted to the receiving device 10 by the sending section 36.

In this manner, the receiving device 10 of the wireless communication device of the present embodiment includes the receiving section 1 for receiving a real-time signal, and a signal outputted from the receiving section 1 is analyzed by the packet analyzing section 2, subjected to error detection or error correction in the error correction section 3, and then stored in the buffer 4. Also, in accordance with the information in the error correction section 3, the communication path evaluation section 20 evaluates the communication path, and the antenna switching control section 5 selects an antenna 11 which is the most suitable at this time. Further, in accordance with the result of the evaluation of the communication path performed by the communication path evaluation section 20 for each predetermined unit, the retransmission request control section 7 picks up a packet or block which has to be re-transmitted, and the packet assembling section 8 assembles a retransmission request packet. Then the sending section 9 sends this retransmission request packet to the sending device 30 having sent the real-time signal.

When this receiving device 10 of the wireless communication device is adopted, even if the signal is degenerated during the transmission, it is possible to minimize the possibility of the interruption of real-time transmission, by performing the retransmission. If circumstances permit the retransmission, it is possible to switch the antenna after the occurrence of an error, since the error can be recovered by the retransmission. For this reason, it is unnecessary to adopt a hardware or high-speed CPU for high-speed processing in a preamble. Further, since it is unnecessary to select the most suitable antenna for the preamble, the switching of the antenna can be carried out after receiving the packet so that a period until performing the synchronization can be shortened, and as a result the length of the preamble can be shortened.

Consequently, when image and audio signals are transmitted between devices of an AV system through wireless communication, a wireless communication device can improve the quality of the signals, without including a hardware or high-speed CPU for high-speed processing.

Further, in the wireless communication device of the present embodiment, the communication path evaluation section 20 of the receiving device 10 includes the packet loss detection section 21 which detects a packet in the received real-time signal, the packet being unable to be received by the receiving device 10.

With this arrangement, a lost packet is detected by the packet loss detection section 21 so that a more suitable antenna 11 can be selected. For this reason, it is possible to recover a packet which could not received by the receiving device 10, by performing retransmission request.

Further, in the wireless communication device of the present embodiment, the communication path evaluation section 20 of the receiving device 10 includes the uncorrectable block detection section 22 which detects (i) a block which is beyond the range of correction and determined as uncorrectable, even if the error correction section 3 attempted to correct errors in each block in the packet, and (ii) a block, which is uncorrectable by nature, in the packet.

With this arrangement, an uncorrectable or erroneous block is detected by the uncorrectable block detection section 22 so that a more suitable antenna 11 can be selected. For this reason, it is possible to recover a block which could not received by the receiving device 10, by performing retransmission request.

Further, in the wireless communication device of the present embodiment, the communication path evaluation section 20 of the receiving device 10 includes the error rate measuring section 23 for measuring the ratio of occurrence of errors in the communication path. With this arrangement, the error rate measuring section 23 measures an error rate in the communication path so that a more suitable antenna 11 can be selected.

Further, in the wireless communication device of the present embodiment, the communication path 20 of the communication path 20 includes the received level measuring section 24 for measuring a received level in the communication path. With this arrangement, the received level measuring section 24 measures a received level in the communication path so that a more suitable antenna can be selected.

Further, in the wireless communication device of the present embodiment, the antenna switching control section 5 switches the antenna 11 when the result of the evaluation of the communication path, the evaluation being performed by the communication path evaluation section 20, is worse than a predetermined value. Thus, when the foregoing result of the evaluation is worse than a predetermined value, it is possible to select a more sensitive antenna 11.

Further, the receiving device 10 of the wireless communication device of the present embodiment controls the antennas 11 so as to switch the same in increments of a predetermined number of packets. Thus, when the condition of communication is unstable right after the switching, the condition is detected and the antenna 11 is switched in increments of a predetermined number of packets, so that it is possible to prevent the antenna 11 from being frequently switched packet-by-packet.

Further, in the wireless communication device of the present embodiment, the antenna switching control section 5 of the receiving device 10 switches the antenna 11 back to the previous one, if the result of the evaluation of the communication path after the switching of the antenna 11 is worse than the result before the switching. Thus, this restoration of the previous antenna 11 prevents the condition of communication from being worsened.

Further, in the wireless communication device of the present embodiment, the antenna switching control section 5 switches the antenna 11 only when the retransmission request can be performed not less than twice. With this arrangement, even if the condition of communication after the switching of the antenna 11 is worse than the condition before the switching, since the antenna switching control section 5 switches the antenna 11 after performing the retransmission request not less than twice, it is possible to improve the condition of communication, during the period of performing the retransmission request not less than twice.

Further, in the wireless communication device of the present embodiment, the antenna switching control section 5 of the receiving device 10 does not switch the antenna 11 when the number of the retransmission requests surpasses a predetermined number. That is to say, when the number of the retransmission requests surpasses a predetermined number, it is indicated that there are a lot of packets requesting retransmission so that the real-time transmission could be interrupted if the condition of reception further worsens.

Thus, the present embodiment is arranged such that, in this situation, the antenna switching control section 5 does not switch the antenna 11. With this arrangement, it is possible to prevent the interruption of the real-time transmission due to the further deterioration of the condition of communication caused by the switching of the antenna 11.

Further, in the wireless communication device of the present embodiment, the antenna switching control section 5 of the receiving device 10 switches the antenna 11 when the number of the retransmission requests keeps surpassing a predetermined number for a predetermined number of times. With this arrangement, the antenna 11 is switched when the number of the retransmission requests keeps surpassing a predetermined number for a predetermined number of times, so that the continuation of bad condition of communication can be avoided.

Further, in the wireless communication device of the present embodiment, the retransmission request control section 7 of the receiving device 10 can set priorities to either blocks in one packet or packets, which request retransmission, in accordance with the result of the evaluation of the communication path performed by the communication path evaluation section 20 for each predetermined unit. With this arrangement, the retransmission request control section 7 requests the retransmission of blocks in a packet or packets with high priorities, in accordance with the result of the evaluation of the communication path, so that the possibility of the interruption of the real-time transmission can be minimized.

Further, in the wireless communication device of the present embodiment, when performing the retransmission request, the retransmission request control section 7 of the receiving device 10 discards the information of either blocks in one packet or packets, which have already caused the interruption of the real-time transmission, and thus the retransmission request control section 7 does not request the retransmission of these blocks or packets. With this arrangement, it is possible to prevent the execution of unnecessary retransmission requests.

Further, in the wireless communication device of the present embodiment, the packet assembling section 8 of the receiving device 10 can request the retransmission of either a plurality of blocks in one packet or a plurality of packets at a time. With this arrangement, since the retransmission of either a plurality of blocks in one packet or a plurality of packets can be requested at a time, it is possible to increase the number of real-time signals which are recovered by a single retransmission.

As described above, a wireless communication device of the present invention comprises a receiving device, the receiving device including: receiving means which receives a real-time signal; packet analyzing means which analyzes a packet of the real-time signal received by the receiving means; error detection/correction means which detects an erroneous block if at least one block in the packet includes an error, and corrects the error which has been detected as much as possible; communication path evaluation means which evaluates a communication path, in accordance with an output from the error detection/correction means; a buffer which temporarily stores received data; at least two antennas; antenna switching means for switching between the antennas; antenna switching control means which causes the antenna switching means to switch between the antennas, in accordance with a result of evaluation of the communication path performed by the communication path evaluation means for each predetermined unit; retransmission request control means which performs retransmission request, in accordance with the result of the evaluation; packet assembling means which assembles a retransmission request packet, in accordance with an order from the retransmission request control means; and sending means which outputs the retransmission request packet supplied from the retransmission request control means, the retransmission request control means performing the retransmission request on condition that the real-time transmission is not interrupted.

This receiving device of the wireless communication device allows to minimize the interruption of real-time transmission due to retransmission, even if a signal is degenerated during the transmission. Further, if circumstances permit the retransmission, it is possible to switch the antenna after the occurrence of error, since the error can be recovered by the retransmission. For this reason, it is unnecessary to adopt a hardware or high-speed CPU for high-speed processing in a preamble. Further, since it is unnecessary to select the most suitable antenna for the preamble, the switching of the antenna can be carried out after receiving the packet so that a period until performing the synchronization can be shortened, and as a result the length of the preamble can be shortened.

As a result, it is possible to provide a wireless communication device which can improve the quality of the signals, without including a hardware or high-speed CPU for high-speed processing, when image and audio signals are transmitted between devices of an AV system through wireless communication.

Further, the foregoing wireless communication of the present invention is arranged in such a manner that the communication path evaluation means includes packet loss detection means which detects, in the real-time signal, a packet which could not be received.

Thus, a lost packet is detected by the packet loss detection means so that a more suitable antenna can be selected. For this reason, it is possible to recover a packet which could not received by the receiving device, by performing retransmission request.

Further, the foregoing wireless communication device of the present invention is arranged in such a manner that, the communication path evaluation means detects (i) a block which is beyond a range of correction and determined as uncorrectable, even if the error detection/correction means attempted to correct errors in each block in the packet, and (ii) a block, which is uncorrectable by nature, in the packet.

Thus, since the uncorrectable block detection detects a block which is either uncorrectable or erroneous so that a more suitable antenna can be selected, a block which could not be received by the receiving device can be recovered by performing the retransmission request.

Further, the foregoing wireless communication device of the present invention is arranged in such a manner that, the communication path evaluation means includes error rate measuring means which measures a ratio of occurrence of errors in the communication path.

Thus, the error rate in the communication path is measured by the error rate measuring means so that a more suitable antenna can be selected.

Further, the foregoing wireless communication device of the present invention is arranged in such a manner that, the communication path evaluation means includes received level measuring means which measures a received level in the communication path.

Thus, the received level in the communication path is measured by the received level measuring means so that a more suitable antenna can be selected.

Further, the foregoing wireless communication device of the present invention is arranged in such a manner that, the antenna switching control means gives instructions to switch between the antennas, when the result of the evaluation of the communication path performed by the communication path evaluation means is worse than a predetermined value.

Thus, when the result of the evaluation of the communication path performed by the communication path evaluation means is worse than a predetermined value, it is possible to select a more sensitive antenna by means of the antenna switching control means.

Further, the foregoing wireless communication device of the present invention is arranged in such a manner that, the antenna switching control means gives instructions to switch between the antennas in increments of a predetermined number of packets.

Thus, when the condition of communication is unstable right after the switching, the condition is detected and the antenna is switched in increments of a predetermined number of packets, so that it is possible to prevent the antenna from being frequently switched packet-by-packet.

Further, the foregoing wireless communication device of the present invention is arranged in such a manner that, the antenna switching control means gives instructions to restore a previous antenna, when the result of the evaluation of the communication path worsens after the antennas have been switched.

Thus, the antenna switching control means gives instructions to restore a previous antenna, when the result of the evaluation of the communication path worsens after the antennas have been switched. With this arrangement, it is possible to prevent the condition of communication from being further worsened.

Further, the foregoing wireless communication device of the present invention is arranged in such a manner that, the antenna switching control means gives instructions. to switch between the antennas only when the retransmission request can be performed not less than twice.

Thus, even if the condition of communication has worsened after the switching of the antennas, the antenna switching control means gives instructions to switch between the antennas only after performing the retransmission request not less than twice, and hence it is possible to make a recovery during the period of performing the retransmission request not less than twice.

Further, the foregoing wireless communication device of the present invention is arranged in such a manner that, the antenna switching control means gives instructions not to switch between the antennas when a number of requests for retransmission surpasses a predetermined number.

Thus, when the real-time transmission could be interrupted if the condition of reception further worsens, the antenna switching control means gives instructions not to switch the antenna on this occasion. With this arrangement, it is possible to prevent the interruption of the real-time transmission due to the further deterioration of the condition of communication caused by the switching of the antenna.

Further, the foregoing wireless communication device of the present invention is arranged in such a manner that, the antenna switching control means gives instructions to switch between the antennas when the number of the requests for retransmission keeps surpassing the predetermined number for a predetermined number of times.

Thus, the antenna switching control means gives instructions to switch between the antennas when the number of the requests for retransmission keeps surpassing the predetermined number for a predetermined number of times, and hence the continuation of bad condition of communication can be avoided.

Further, the foregoing wireless communication device of the present invention is arranged in such a manner that, the retransmission request control means can set priorities to either blocks in one packet or packets, which request retransmission, in accordance with the result of the evaluation of the communication path.

Thus, the retransmission request control means performs the transmission request from either blocks in one packet or packets having higher priorities, in accordance with the result of the evaluation of the communication path performed by the communication path evaluation means for each predetermined unit, and hence it is possible to minimize the possibility of the interruption of the real-time transmission.

Further, the foregoing wireless communication device of the present invention is arranged in such a manner that, when performing the retransmission request, the retransmission request control means discards information of either blocks in one packet or packets, which have already caused interruption of the real-time transmission, and hence the retransmission request control means do not request retransmission of these blocks or packets.

Thus, when performing the retransmission request, the retransmission request control means discards information of either blocks in one packet or packets, which have already caused interruption of the real-time transmission, and hence the retransmission request control means do not request retransmission of these blocks or packets. With this arrangement, it is possible to prevent the retransmission request control means from unnecessarily performing retransmission request.

Further, the foregoing wireless communication device of the present invention is arranged in such a manner that, the packet assembling means can request retransmission of either a plurality of blocks in one packet or a plurality of packets at a time.

Thus, since the packet assembling means can request retransmission of either a plurality of blocks in one packet or a plurality of packets at a time, it is possible to increase the number of real-time signals to be recovered by the retransmission.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

According to the above-described arrangement, a receiving device of a wireless communication device includes receiving means for receiving a real-time signal, and the signal outputted from the receiving means is analyzed by packet analyzing means, subjected to error detection or error correction in error detection/correction means, and then stored in a buffer. In accordance with the information in the error detection/correction means, a communication path evaluation means evaluates a communication path, and antenna switching control means selects an antenna which is the most suitable at this time. Further, in accordance with the result of the evaluation of the communication path performed by the communication path evaluation means for each unit, a packet or block which has to be retransmitted is determined by the retransmission information control means, and the packet assembling means assembles a retransmission request packet. The sending means sends this retransmission request packet to the sending device which has sent the real-time signal.

This receiving device of the wireless communication device allows to minimize the interruption of real-time transmission due to retransmission, even if a signal is degenerated during the transmission. Further, if circumstances permit the retransmission, it is possible to switch the antenna after the occurrence of error, since the error can be recovered by the retransmission. For this reason, it is unnecessary to adopt a hardware or high-speed CPU for high-speed processing in a preamble. Further, since it is unnecessary to select the most suitable antenna for the preamble, the switching of the antenna can be carried out after receiving the packet so that a period until performing the synchronization can be shortened, and as a result the length of the preamble can be shortened.

Consequently, it is possible to provide a wireless communication device which can improve the quality of signals, without including a hardware or high-speed CPU for high-speed processing, when image and audio signals are transmitted between devices of an AV system through wireless communication.

What is claimed is:

1. A wireless communication device which realizes real-time transmission through bandwidth guarantee, comprising a receiving device, the receiving device including:

receiving means for receiving a real-time signal;

packet analyzing means for analyzing a packet of the real-time signal received by the receiving means;

error detection/correction means for detecting an erroneous block if at least one block in the packet includes an error, and corrects the error which has been detected as much as possible;

communication path evaluation means for evaluating a communication path, in accordance with an output from the error detection/correction means;

a buffer which temporarily stores receiving data;

at least two antennas;

antenna switching means for switching between the antennas;

antenna switching control means for causing the antenna switching means to switch between the antennas, in accordance with a result of evaluation of the communication path performed by the communication path evaluation means for each predetermined unit;

retransmission request control means for performing retransmission request, in accordance with the result of the evaluation;

packet assembling means for assembling a retransmission request packet, in accordance with an order from the retransmission request control means; and sending means for outputting the retransmission request packet supplied from the retransmission request control means;

the retransmission request control means performing the retransmission request on condition that the real-time transmission is not interrupted.

2. The wireless communication device as defined in claim 1, wherein, the communication path evaluation means includes packet loss detection means for detecting, in the received real-time signal, a packet which could not be received.

3. The wireless communication device as defined in claim 2, wherein, the retransmission request control means can set priorities to either blocks in one packet or packets, which request retransmission, in accordance with the result of the evaluation of the communication path.

4. The wireless communication device as defined in claim 2, wherein, when performing the retransmission request, the retransmission request control means discards information of either blocks in one packet or packets which have already caused interruption of the real-time transmission, and hence the retransmission request control means do not request retransmission of the blocks or packets.

5. The wireless communication device as defined in claim 2, wherein, the packet assembling means can request retransmission of either a plurality of blocks in one packet or a plurality of packets at a time.

6. The wireless communication device as defined in claim 1, wherein, the communication path evaluation means detects (i) a block which is beyond a range of correction and determined as uncorrectable, even if the error detection/correction means attempted to correct errors in each block in the packet, and (ii) a block, which is uncorrectable by nature, in the packet.

7. The wireless communication device as defined in claim 6, wherein, the retransmission request control means can set priorities to either blocks in one packet or packets, which request retransmission, in accordance with the result of the evaluation of the communication path.

8. The wireless communication device as defined in claim 6, wherein, when performing the retransmission request, the retransmission request control means discards imformatiom of either block in one packet or packets, which already cause interruption of real-time transmission, and hence do not request retransmission of the blocks or packets.

9. The wireless communication device as defined in claim 6, wherein, the packet assembling means can request retransmission of either a plurality of blocks in one packet or a plurality of packets at once.

10. The wireless communication as defined in claim 1, wherein, the communication path evaluation means includes error rate measuring means for measuring a ratio of occurrence of errors in the communication path.

11. The wireless communication device as defined in claim 1, wherein, the communication path evaluation means includes received level measuring means for measuring a received level in the communication path.

12. The wireless communication device as defined in claim 1, wherein, the antenna switching control means gives instructions to switch between the antennas, when the result of the evaluation of the communication path is worse than a predetermined value.

13. The wireless communication device as defined in claim 12, wherein, the antenna itching control means gives instructions to switch between the antennas in increments of a predetermined number of packets.

14. The wireless communication device as defined in claim 12, wherein, the antenna switching control means gives instructions to restore a previous antenna, when the result of the evaluation of the communication path worsens after the antennas have been switched.

15. The wireless communication device as defined in claim 12, wherein, the antenna switching control means gives instructions to switch between the antennas only when the retransmission request can be performed not less than twice.

16. The wireless communication device as defined in claim 15, wherein, the antenna switching control means gives instructions not to switch between the antennas when a number of requests for retransmission surpasses a predetermined number.

17. The wireless communication device as gives instructions to switch between the antennas when the number of the requests for retransmission keeps surpassing the predetermined number for a predetermined number of times.

* * * * *